United States Patent [19]
Tanio

[11] Patent Number: 5,764,659
[45] Date of Patent: Jun. 9, 1998

[54] APPARATUS FOR PREVENTING WRITING TO A RELEASABLE STORAGE DEVICE

[75] Inventor: Satoshi Tanio, Tokyo, Japan

[73] Assignee: Canon Kabushiki Kaisha, Tokyo, Japan

[21] Appl. No.: 97,624

[22] Filed: Jul. 27, 1993

Related U.S. Application Data

[63] Continuation of Ser. No. 491,290, Mar. 19, 1990, abandoned.

[30] Foreign Application Priority Data

Mar. 10, 1989 [JP] Japan ................................. 1-58663
Mar. 10, 1989 [JP] Japan ................................. 1-58664

[51] Int. Cl.$^6$ ........................... G06F 11/08; G11C 29/00
[52] U.S. Cl. ............................. 371/51.1; 395/185.07
[58] Field of Search ........................ 371/21.5, 51.1; 235/380; 395/185.07

[56] References Cited

U.S. PATENT DOCUMENTS

| | | | |
|---|---|---|---|
| 4,742,507 | 5/1988 | Kuroki et al. | 369/54 |
| 4,791,622 | 12/1988 | Clay et al. | 369/59 |
| 4,800,520 | 1/1989 | Iijima | 235/382 |
| 4,839,792 | 6/1989 | Iijima | 235/380 X |
| 4,993,030 | 2/1991 | Krakauer | 371/40.1 |

*Primary Examiner*—Stephen M. Baker
*Attorney, Agent, or Firm*—Fitzpatrick, Cella, Harper & Scinto

[57] ABSTRACT

An electronic apparatus which writes information into a storage device which includes directory and data parts. The apparatus has retrieval means for retrieving file names from the directory part and control means which checks a retrieved file name to see whether information is terminated improperly in the data portion corresponding to the file name; and if the data is not terminated normally, the control means prohibits the writing of new information in that data part.

5 Claims, 9 Drawing Sheets

APPARATUS FOR PREVENTING WRITING TO A RELEASABLE STORAGE DEVICE

This is a continuation of application Ser. No. 491,290 filed Mar. 19, 1990, now abandoned.

BACKGROUND OF THE INVENTION

1. Field of the Invention

This invention relates to an information processing apparatus which correctly reads out and writes information from and into a storage device.

2. Description of the Related Art

In the prior art, access to a memory card storage device by units of files is performed by reading in the specifications of a medium from the card itself and performing logic file management in accordance with such specifications. However, since a memory card storage device is used in various environments, the card's memory itself is not reliable. In a case where a memory card is used in business, reliability is particularly important. In the prior art storage device, there was a drawback in that integrity measures for data were not performed while accessing the memory card by units of records.

In a case where a certain abnormality has occurred during an operation for writing a file to a releasable storage device, such as a RAM card, and the writing operation is abnormally stopped, in order to indicate that the file is an incomplete file, an error processing routine is called before the processing is terminated, and a flag for indicating the termination status of the writing is set in the memory of the RAM card.

SUMMARY OF THE INVENTION

An object of the present invention is to provide an electronic apparatus which writes information in a releasable storage device and which handles the releasable storage device, the apparatus having a control means for respectively setting and resetting a signal in the storage device for indicating whether or not writing information to the storage device is terminated abnormally when writing to the storage device is respectively started and terminated, a check means for checking to see whether or not the signal is set when new information is to be written in the storage device, and a means for prohibiting writing of the new information when the checking means indicates that the signal is set.

Another object of the present invention is to provide an information processing apparatus which writes information in a storage device, the apparatus having a selection means for selecting whether or not the writing of results from checking the information is to be performed in a case where information is to be written in the storage device, and a means for writing the information and writing the checking results.

A further object of the present invention is to provide an electronic apparatus which writes information in a storage device, which has a control means for writing an indication of whether or not a storing operation is terminated normally in a case where information is stored in the storage device, a retrieval means for retrieving the writing position from the storage device in a case where information is written in the storage device, and a control means for stopping the writing of new information to a corresponding position in a case where an indication of information for which storage control has not been performed normally is retrieved by the retrieving means.

Still a further object of the present invention is to provide an electronic apparatus which writes information in a storage device, which has a selection means for selecting whether or not a checksum of the information should be written, in a case where information is to be stored in the storage device, and a control means for writing the information, as well as its checksum, in the storage device according to the selection that the checksum should be written.

Still a further object of the present invention is to provide an information processing apparatus which reads out information stored in a storage device, which has a judgment means for judging whether or not the information should be stored with a checksum, and a control means for reading out information and a checksum from the storage device and checking the information and checksum in the case where it is judged by the judgement means that the checksum should be stored.

Still a further object of the present invention is to provide an information processing apparatus which reads out information stored in a storage device, which has a judgment means for judging whether or not the information should have been stored with a checksum information, and a control means for reading out information from the storage device in the case where it is judged by the judgement means that a checksum should not be stored.

Still a further object of the present invention is to provide an information processing apparatus which reads out information stored in a storage device, which has a judgment means for judging whether or not the information should be stored with its checksum, a first control means for reading out information from the storage device in a case where a checksum is determined to be normal in the case where it is judged by the judgement means that the checksum should be stored, and a second control means for reading out information from the storage device in the case where it is judged by the judgement means that a checksum should not be stored.

Still a further object of the present invention is to provide an information processing apparatus which reads out information stored in a storage device, which has a judgment means for judging whether or not the information should be stored with its checksum, and a control means for stopping the read-out of information from the storage device if the checksum does not agree with the information in the case where it is judged by the judgement means that the checksum should be stored.

These and other objects, features and advantages of the present invention will become clear by the following description of a preferred embodiment of the present invention with reference to the accompanying drawings, wherein:

DETAILED DESCRIPTION OF THE PREFERRED EMBODIMENT

Figure 1:
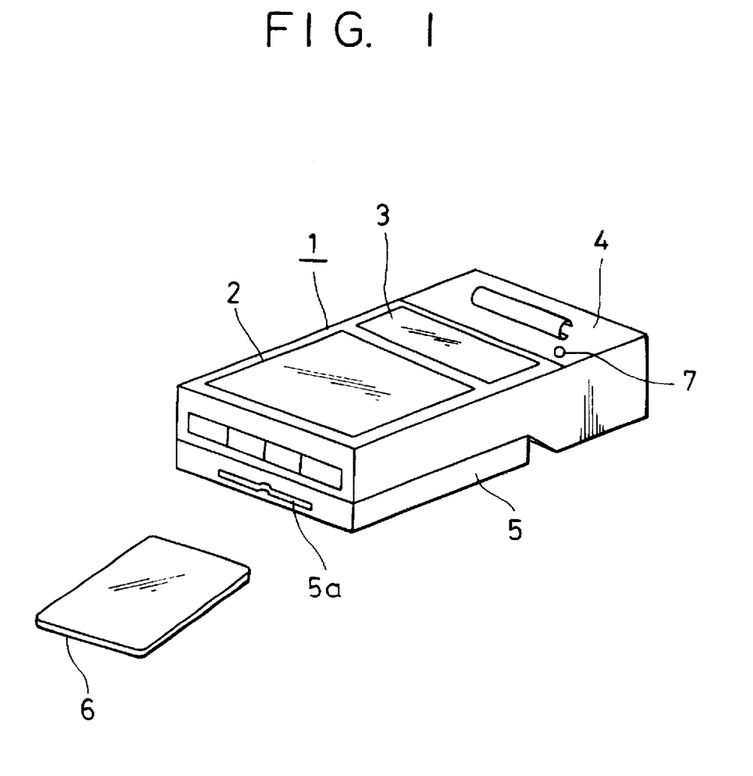
FIG. 1 is a perspective view of an embodiment of the present invention.

FIG. 1 is a perspective view of the outer appearance of the first embodiment of the present invention. Shown in the figure are a handy terminal 1 of an information processing apparatus, its keyboard 2, an indicator 3, a printer section 4, a reader/writer section 5, which writes information in a memory card 6 of a releasable storage device and reads out information from the card 6, a card insertion slot 5a. The memory card 6 has a directory and an entity section, the directory having a file name and containing information for ascertaining whether a checking process needs to be performed, and a power supply switch 7.

Figure 2:
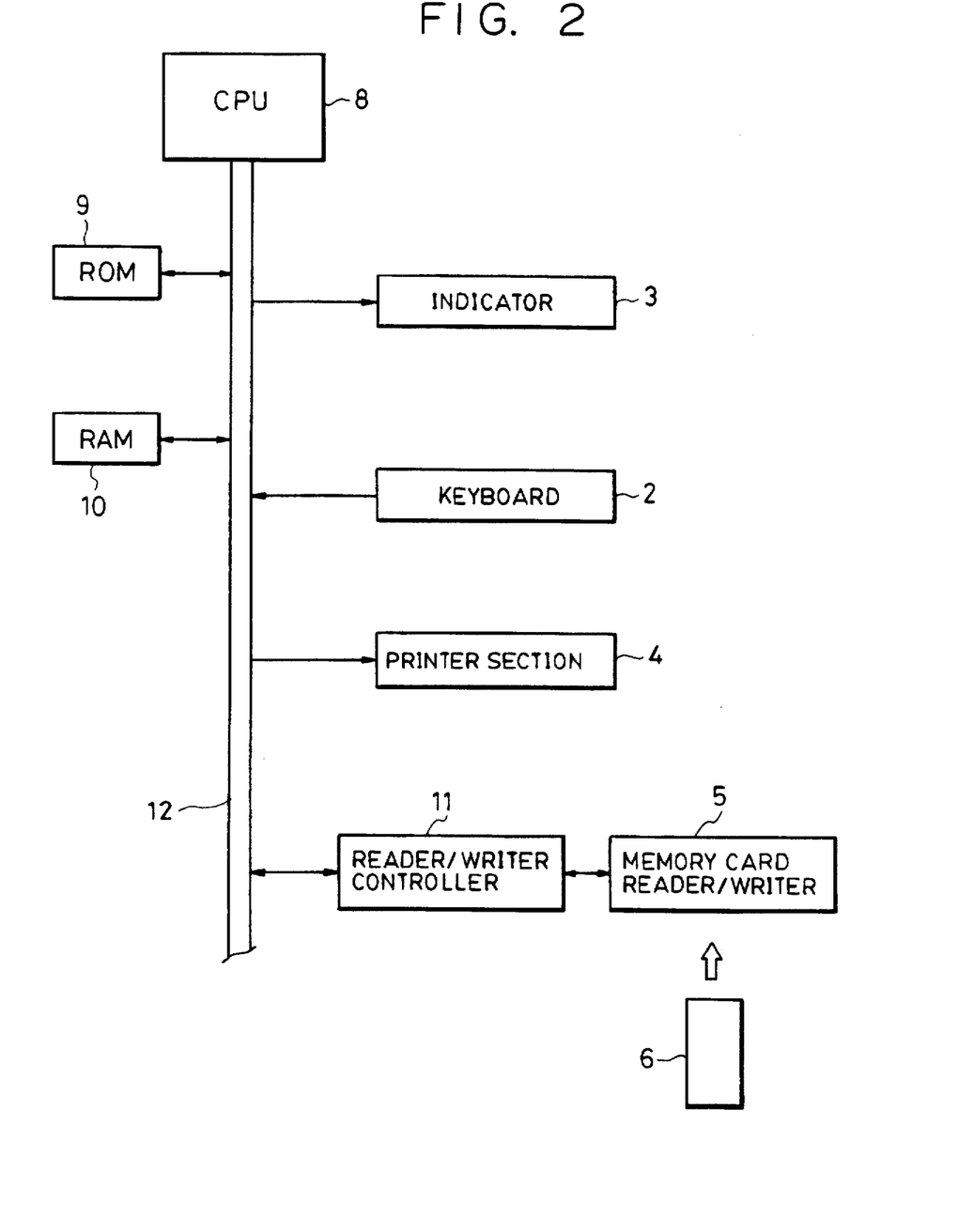
FIG. 2 is a block diagram of the embodiment shown in FIG. 1.

FIG. 2 is a block diagram of the view contained in FIG. 1. In this figure, the same parts as those of FIG. 1 are given like character numerals. Shown in the figure are a CPU 8 of the processing section, a ROM 9 of the control memory for storing the control procedure of the present invention shown in FIG. 3B, a RAM memory 10 in which data to be processed, etc. is stored, a controller 11 of the reader/writer, a bus 12 for transferring signals of data, addresses, and control.

The operation of the above-mentioned embodiment will be explained next, with reference to FIGS. 3A and 3B.

Figure 3A:
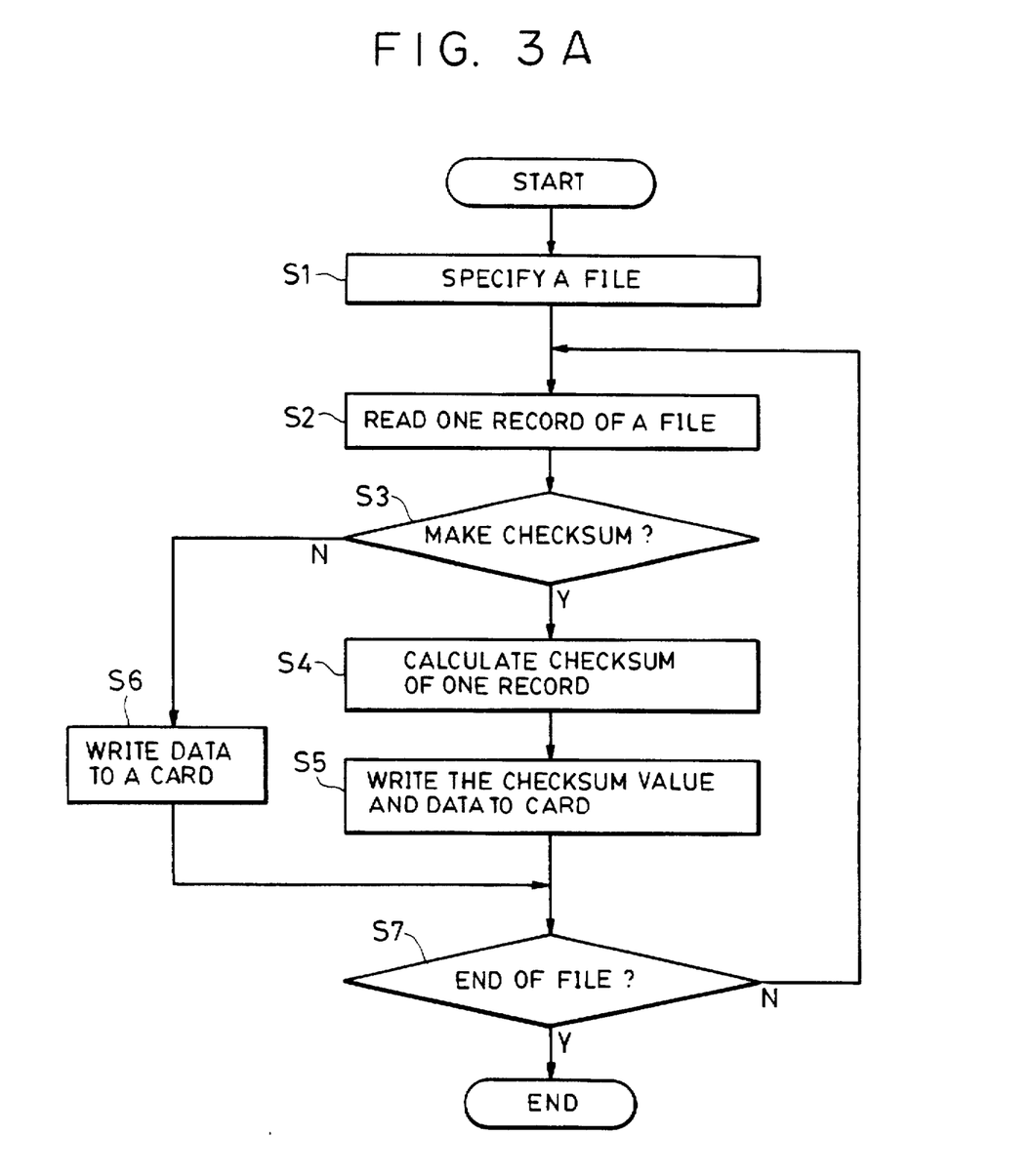
FIGS. 3A and 3B are views for illustrating the control procedure.

In FIG. 3A, in step S1, a file name of a file to be written in the memory card 6 is specified from the keyboard. In step S2, one record of the file is read out. In step S3, if it is specified by the directory that a checksum should be made from the information, a no-sign addition is performed in units of bytes in step 4 on the data read out in step S2, after which the 1's complement is calculated, and in step 5 data of one record and its checksum value is written in the card. If, in step S3, it is specified by information present in the directory of the memory card that a checksum is not to be made, one record, as it exists, is written in the card. In step S7, it is judged whether or not the file is written completely. If it is not yet written completely, the system returns to step S2, and when the file is completely written, the processing is then terminated.

Figure 3B:
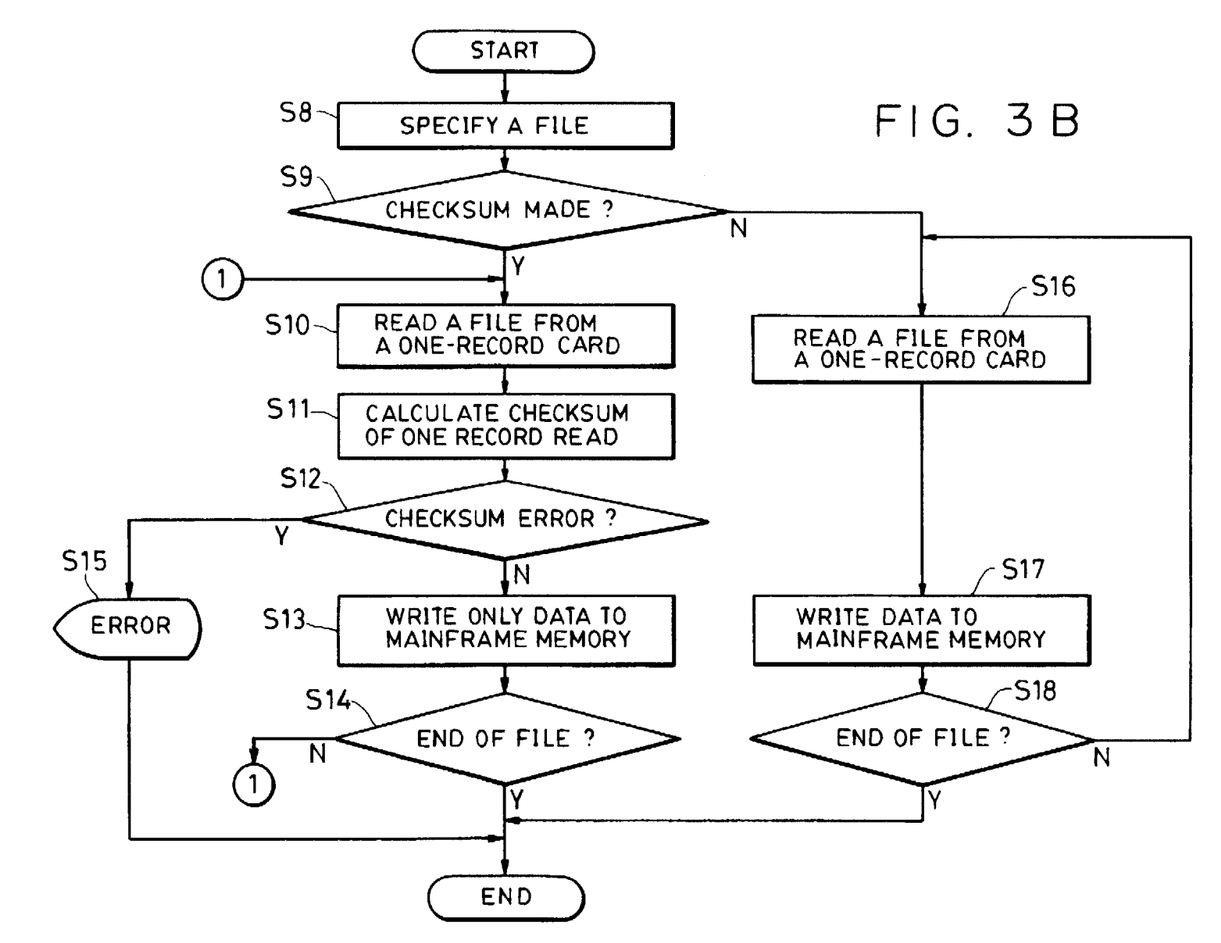

In FIG. 3B, in step S8, a file to be read out from the memory card 6 is specified through the keyboard.

In step S9, it is determined whether a checksum process is to be performed on the file to be read, and the file is to be checked, by reading information present in the directory. If the file is one on which a checksum process is to be performed, data of one record and its checksum value are read out from the card in step S10. In step S11, a checksum process is performed on the data of one record in the same manner as the checksum process was performed in step S4 of FIG. 3A. A check of whether or not the checksum calculated in step S11 matches the checksum value read out in step S10 is performed by the judgment section in step S12. At this time, if the two values do not match, this fact is displayed on the indicator 3 as an error in step S15. If they match, the data is loaded into the mainframe of the apparatus. In step S14, it is determined whether or not the file is completely loaded. If it is not yet loaded, the system returns to step S10, and when the file is completely loaded, the processing is then terminated. On the other hand, if in Step S9 the file is found to be a file on which a checksum process is not performed, one record of the file is read out from the card in step S16 and is loaded in step S17. When the loading is complete, the processing is terminated.

In this embodiment, for the saving/loading to and from a memory card in units of files with respect to the mainframe of the apparatus, integrity is improved by performing a checksum process, and if an abnormality has occurred, this fact is communicated at file load. The selection of whether or not a checksum process should be performed was explained on the premise that the selection is written in the directory. However, the selection may be input from the keyboard.

As set forth hereinabove, the integrity of the data block is improved by selectively performing a checksum process on every data block of specific records. Further, because a checksum is performed on every block, the checksum process is efficient. Since a checksum process is performed on records in this embodiment, there is an advantage in that even if an abnormality is found in a certain record by the checksum process, the correctness of the other records can be guaranteed, and therefore reliability is improved.

Figure 4:
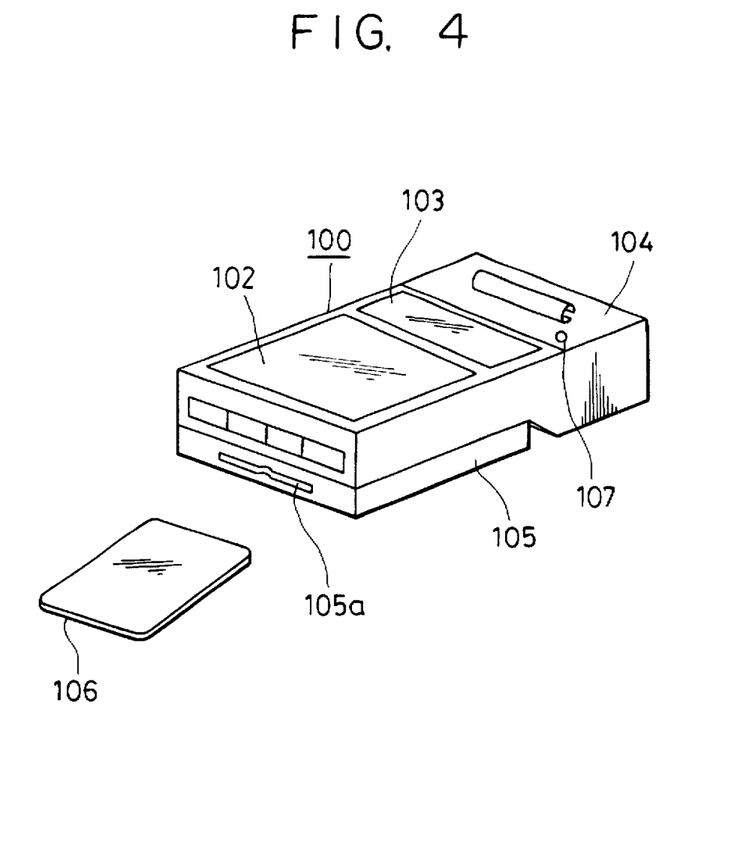
FIG. 4 is a perspective view for illustrating another embodiment of the present invention.
Figure 7:
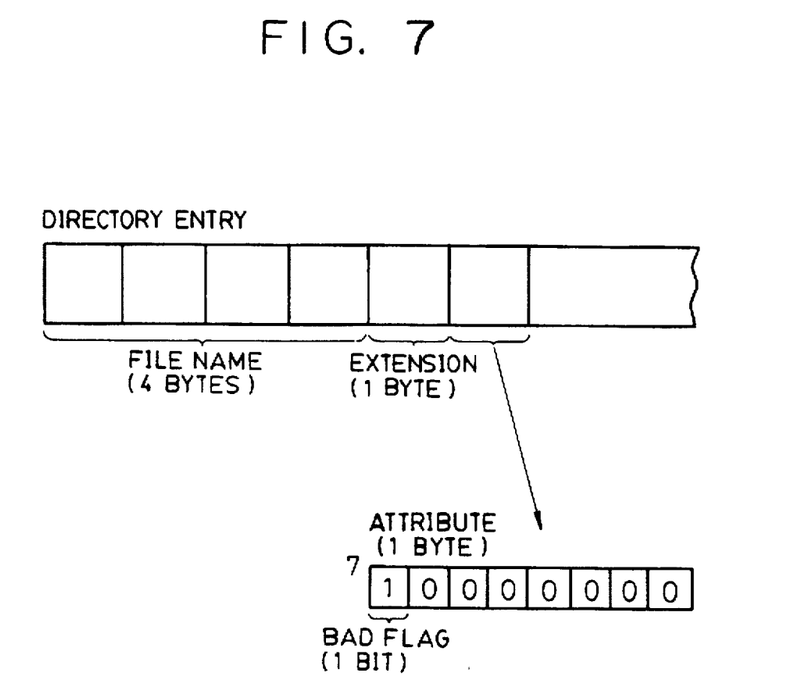
FIG. 7 is a view for illustrating the data structure of a RAM card.

FIG. 4 is an outer appearance view for illustrating another embodiment of the present invention. Shown in the figure are a handy terminal 100 of an electronic apparatus, its keyboard 102, an indicator 103, a printer section 104, a reader/writer section 105, which writes and reads out information to and from a releasable memory card storage device 106 having a data structure shown in FIG. 7, a card insertion slot 105a, and a power supply switch 107.

Figure 5:
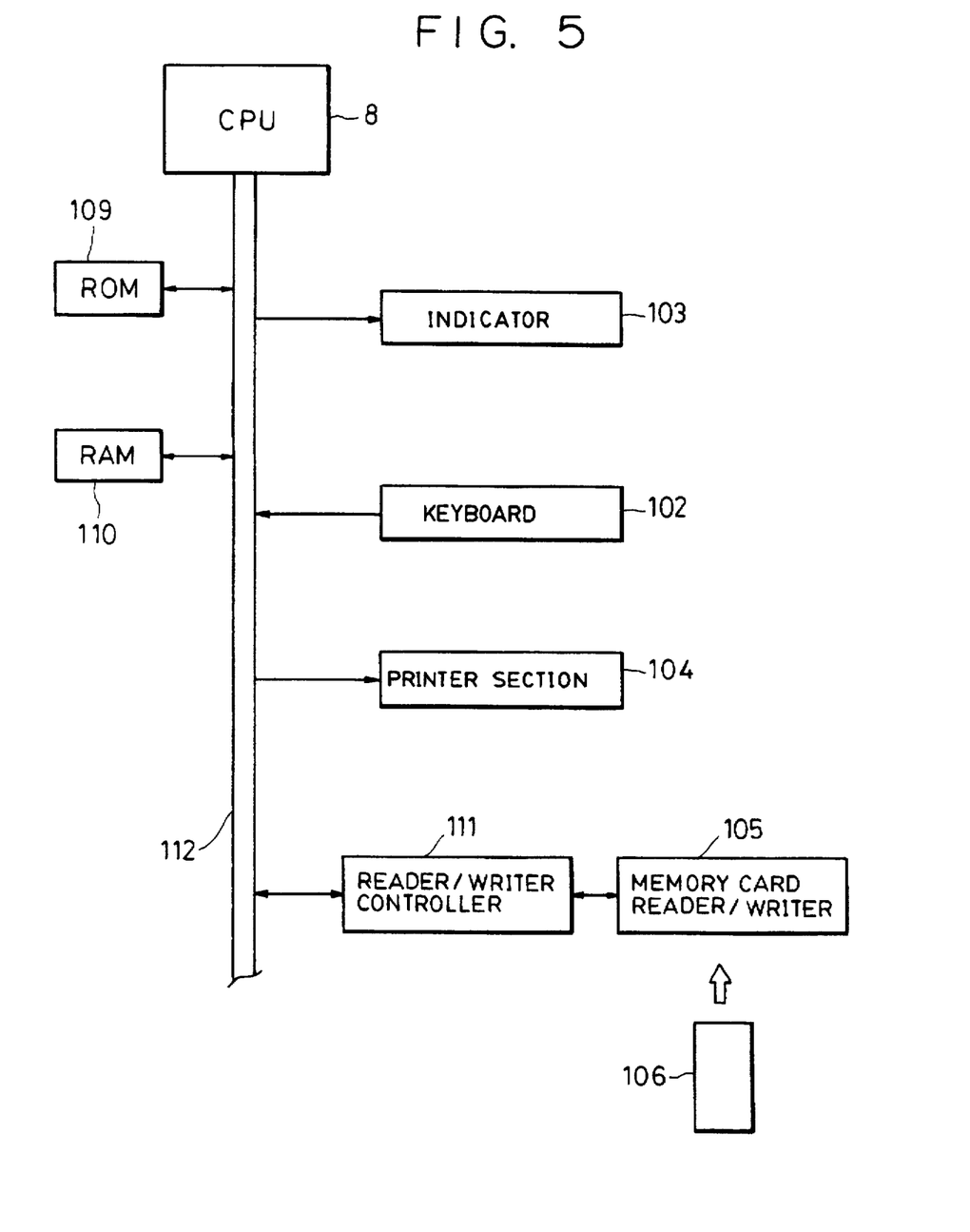
FIG. 5 is a block diagram of the embodiment shown in FIG. 4.

FIG. 5 is a block diagram of the view contained in FIG. 4. In this figure, the same parts as those of FIG. 4 are given like character numerals. Shown in the figure are a CPU 108 of the processing section, a ROM 109 of the control memory for storing the control procedure of the present invention shown in FIG. 6, a RAM memory 110 in which data to be processed, etc. is stored, a controller 111 of the reader/writer, and a bus 112 for transferring data, address, and control signals.

The operation of the embodiment having the above-mentioned configuration will be explained next.

Figure 6A:
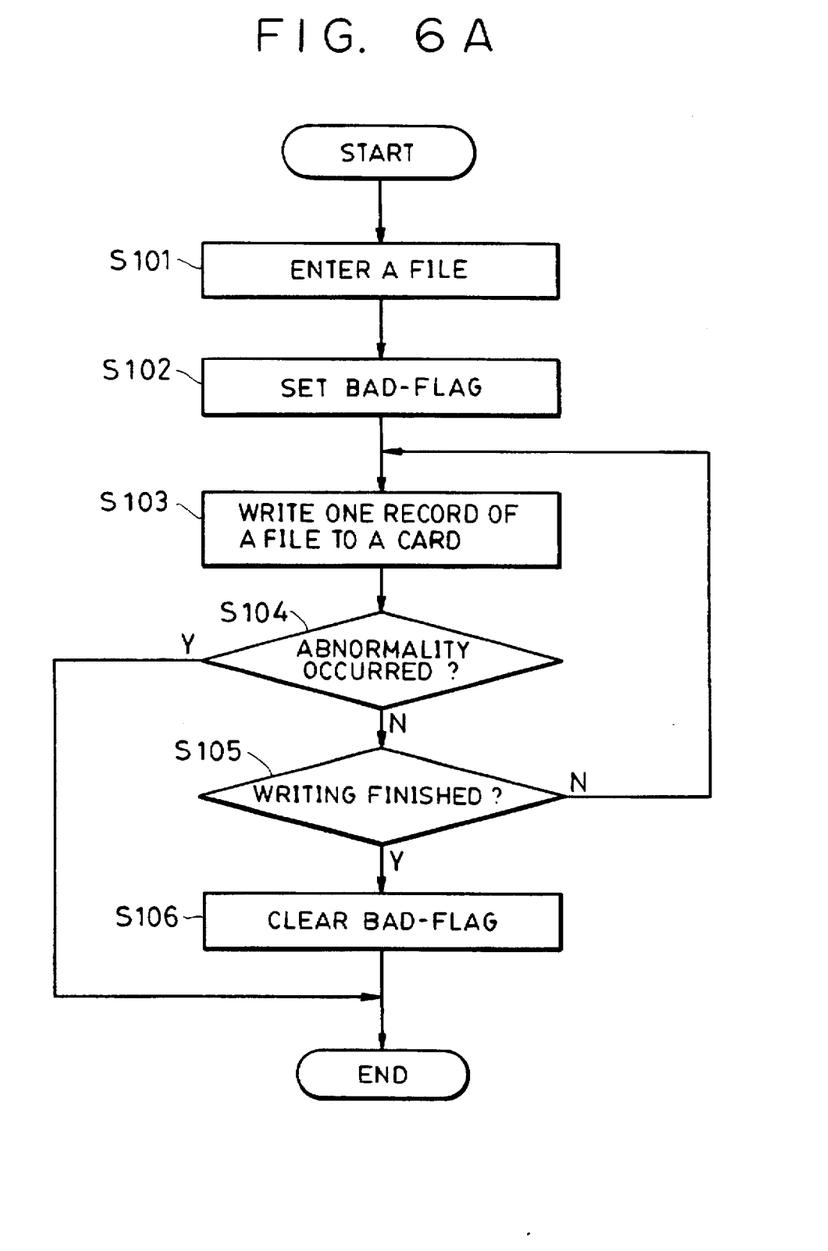
FIGS. 6A and 6B are views for illustrating the control procedure.

In this figure, in step S1, a file is entered into the directory of the RAM card 106. In step S2, a Bad_flag of the directory entry is set to 1. In step S3, the records of the file are written in the RAM card 106. In step S4, it is determined whether or not an abnormality has occurred, and in step S5, it is determined whether or not the writing of the file is terminated. The Bad_flag, which is set in step S2, is cleared in step S6. Thus only when the processing is terminated normally, is this flag cleared to 0.

In the above-mentioned embodiment, by checking whether or not the Bad_flag of the directory entry is set, it can be determined whether or not the file writing has been abnormally terminated.

If a file created in the RAM card 106 as mentioned above is handled, for example, for an update, it is processed as described below.

Figure 6B:
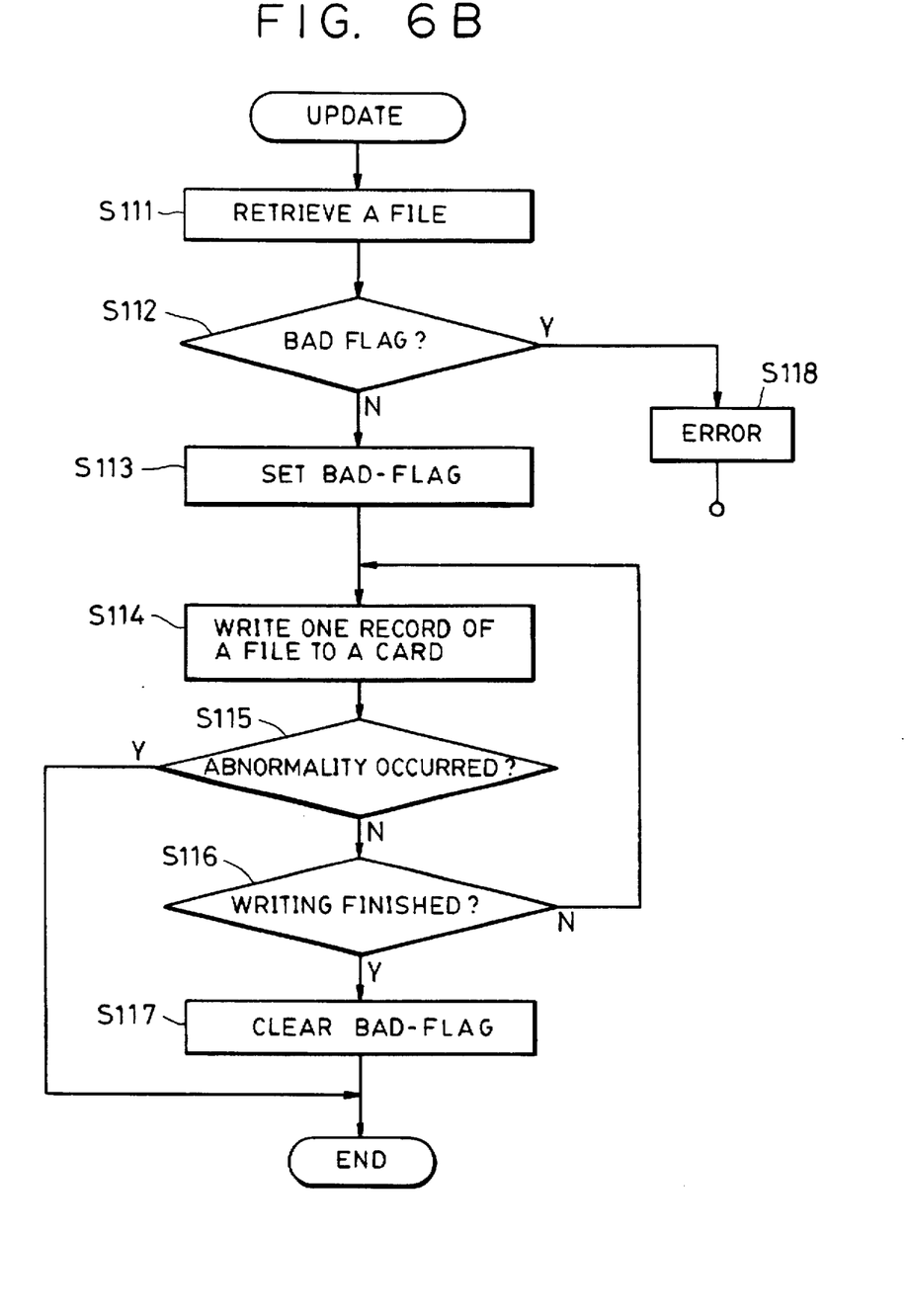

First, in step S11, a file name to be updated is retrieved from the directory of the memory of the RAM card 106, and it is determined whether its Bad_flag is 1 or 0. If 1 has been set, the fact that an abnormality has occurred at a previous writing is displayed on the indicator 103, and the processing is terminated. If the Bad_flag is 0 in step S12, this indicates that the RAM card is normal. Therefore, steps S13 to S17, which are the same processing procedures as steps S2 to S6 shown in FIG. 6A, are performed and the processing is terminated.

In the above-mentioned example, a memory card is used. However, it goes without saying that even if a structure other than memory is present in a card, it is within the scope of the present invention.

As explained above, when an abnormality occurs, by changing the flag status for indicating the termination status of a writing at the time when a data block is started to be written in a storage device, and at a normal termination time, access to the storage device is not needed after the occurrence of the abnormality. If an abnormality, such as a removal of a storage device during writing data to the storage device occurs, it is no longer possible to access to the storage device. However, since the flag has already been set at this time, the present invention has an advantage in that the termination status of a writing can be stored in the storage device.

As many apparently widely different embodiments of the present invention can be made without departing from the spirit and scope thereof, it is to be understood that this invention is not limited to the specific embodiment thereof except as defined in the appended claims.

What is claimed is:

1. An electronic apparatus which writes information in a releasable storage device having a directory part and a data part and handles said releasable storage device, said apparatus comprising:

retrieval means for retrieving a file name stored in said directory part;

control means for setting a signal representative of termination status of writing of the information, in response to a retrieval by said retrieval means, in an attribute area of a file name stored in said releasable storage device, before writing of the information to said releasable storage device is started, and for resetting the signal representative of termination status of the information written in the attribute area of a file name in said releasable storage device, after writing of the information to said to said releasable storage device is terminated, check means for checking, after the file name is retrieved by said retrieval means, to see whether or not the signal is set in said releasable storage device before new information is written in said releasable storage device; and means for prohibiting writing of the new information in the data part of said releasable storage device when said check means indicates that the signal is set in said releasable storage device.

2. An electronic apparatus which writes information in a releasable storage device according to claim 1, wherein said storage device comprises a RAM.

3. An electronic apparatus which writes information in a releasable storage device according to claim 1, wherein said storage device has an area for storing in pairs a signal for indicating that there exists information to be processed and information to be stored.

4. An electronic apparatus which writes information in a storage device having a directory area and a data area and handles said storage device, said apparatus comprising:

first retrieval means for retrieving a file name stored in said directory area;

control means for writing status-information indicating whether or not a storing operation is terminated normally in accordance with a retrieval by said first retrieval means, in a case where information is to be stored in the data area of said storage device, said control means writing the status-information in the directory area of the storage device;

second retrieval means for retrieving, after the file name is retrieved by said first retrieval means, the writing position of information, written into the directory area of said storage device, when the status information is written in said storage device;

means for preventing writing of new information to said storage device when the status-information indicates that the storing operation has not terminated normally;

checking means for checking the information to be written and for generating a result of an arithmetic operation on the information; and control means responsive to a first check result provided by said checking means for reading out the information in the storage device, and responsive to a second check result provided by said checking means for inhibiting the reading out of the information and generating an error signal.

5. An electronic apparatus which writes information in a storage device having a directory area and a data area and handles said storage device, said apparatus comprising:

first retrieval means for retrieving a file name stored in said directory area;

second retrieval means for retrieving, after the file name is retrieved by said first retrieval means, the writing position of information written into the directory area of said storage device when the status-information is written in said storage device;

control means for determining status-information indicating whether or not a storing operation is terminated normally in accordance with a retrieval by said second retrieval means, in a case where information is to be stored in the data area of said storage device, said control means determining the status-information in the directory area of the storage device; and means for preventing reading the information to said storage device when the status-information indicates that the storing operation has not terminated normally;

checking means for checking the information to be written and for generating a result of an arithmetic operation on the information; and control means responsive to a first check result provided by said checking means for reading out the information in the storage device, and responsive to a second check result provided by said checking means for inhibiting the reading out of the information and generating an error signal.

* * * * *

UNITED STATES PATENT AND TRADEMARK OFFICE
CERTIFICATE OF CORRECTION

PATENT NO. : 5,764,659

DATED : June 9, 1998

INVENTOR(S): SATOSHI TANIO

It is certified that error appears in the above-identified patent and that said Letters Patent is hereby corrected as shown below:

COLUMN 3

Line 43, "is to be" should read --is--; (2nd occurrence)
Line 44, "checked," should read --checked--.

COLUMN 5

Line 22, "part:" should read --part;--;
Line 32, "to said to said" should read --to said--;
Line 33, "terminated," should read --terminated;--.

Signed and Sealed this

Thirtieth Day of March, 1999

Attest:

Q. TODD DICKINSON

Attesting Officer        Acting Commissioner of Patents and Trademarks